July 19, 1955 J. B. AYERS 2,713,496
COMBINED STEERING AND BRAKING MEANS FOR CHILD'S VEHICLE
Filed Dec. 10, 1954

INVENTOR.
James B. Ayers
BY
Att'y

United States Patent Office 2,713,496
Patented July 19, 1955

2,713,496

COMBINED STEERING AND BRAKING MEANS FOR CHILD'S VEHICLE

James B. Ayers, San Francisco, Calif.

Application December 10, 1954, Serial No. 474,354

1 Claim. (Cl. 280—87.01)

This invention relates to improvements in a combined steering and braking means for children's vehicles.

The principal object of this invention is to provide a vehicle upon which a child may ride, and steer the vehicle over any desired course, at the same time enabling the child to control the slowing down or stopping of the vehicle in a safe and efficient manner.

A further object is to provide a vehicle which will be attractive to the child, one which is easy to manipulate, and one wherein the braking effort will be easy for the child to execute, and a vehicle wherein the child does not have to use its foot for the braking effort, thus saving the shoes from excessive scuffing.

A further object is to provide means for accomplishing the various objects in an efficient and economical manner.

Other objects and advantages will be apparent during the course of the following description.

In the accompanying drawings forming a part of this specification and in which like numbers are employed to designate like parts throughout the same, Fig. 1 is a top plan view of my vehicle;

Figure 1:
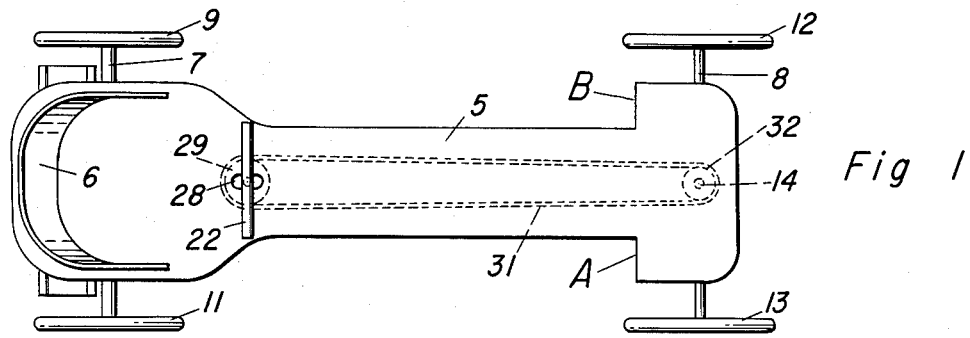
Figure 2:
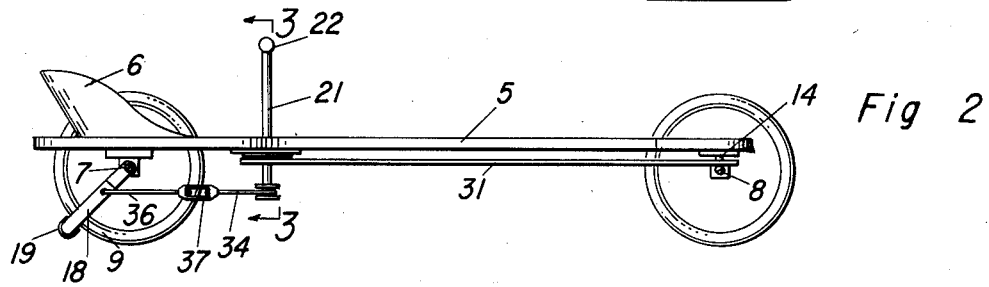
Fig. 2 is a side elevation of Fig. 1 with the wheels adjacent the viewer removed.
Figure 3:
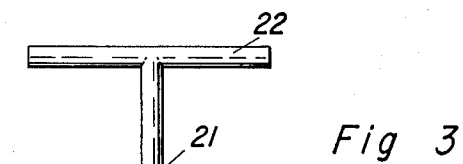
Fig. 3 is an enlarged cross sectional view taken on the line 3—3 of Fig. 2.

Children derive a great deal of pleasure in coasting down grades on wheeled vehicles. These wheeled vehicles are usually merely a platform mounted on wheels, two of which can be steered, and then by dragging the feet, a braking action takes place. This braking action at best is mild in that it is hard to effect excessive pressure downward on to the feet, and often the momentum carries the vehicle into an obstruction and causes a serious accident.

Applicant has therefore devised a vehicle wherein the same lever which is used for steering may also be rocked so as to cause a braking action of considerable force, thus stopping the vehicle quickly and efficiently with minimum effort.

Further, the action is such that the braking action occurs no matter whether the vehicle is moving forward in a straight line or around a curve or going backwards.

In the accompanying drawings, wherein for the purpose of illustration is shown a preferred embodiment of my invention, the numeral 5 designates the vehicle body which has the customary seat 6, a rear axle 7 and a front axle 8. Wheels 9 and 11 are secured to the rear axle, while wheels 12 and 13 are secured to the front axle. The front axle is pivoted as shown at 14, to the body 5.

The description thus far applies to a coaster in general and my invention consists of pivoting to the rear axle through the medium of hangers 16 and 17 a braking board 18 having a shoe 19 secured thereto. This shoe is preferably made of rubber or similar material which will cause a given amount of friction with a minimum amount of noise.

At 21 I have shown a steering post having a handle 22, which steering post extends through the body 5 and has a cross pin 23 which rides in a channel-like fitting 24. This fitting has an opening therethrough, as does also a plate 26, which plate and the fitting are secured to the body 5 by bolts 27.

There is also a hole 28 formed in the body 5.

This arrangement permits the steering post 21 both to rotate and to rock, the purpose of which will be later seen.

Positioned beneath the fitting 24 and secured to the post is a sprocket 29 about which is reeved a chain 31, which chain is also reeved about a similar sprocket 32 secured to the front axle 8.

Positioned on the lower end of the steering post are spaced collars 33 between which is mounted one end of a turn-buckle link 34, while a similar turnbuckle link 36 is secured to the board 18, while a turnbuckle 37 connects the two links and forms an adjusting means.

It is obvious that when a child sits on the seat upon the body of the vehicle and presses his feet on the rests A and B, then, assuming that the vehicle is on a slight grade, by grasping the handle 22 and rotating the steering post about a vertical pivot, any rotation will in turn be transmitted through the sprocket 29, chain 31, sprocket 32, to the front axle, thus effecting steering of the vehicle.

Figure 4:
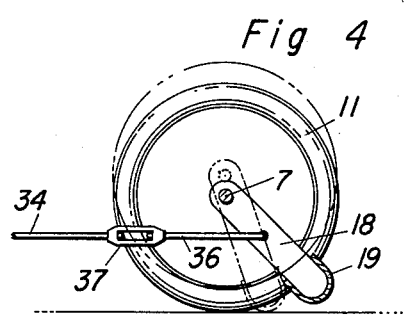
Fig. 4 is an enlarged fragmentary view showing the manner in which the braking action takes place.
Figure 5:
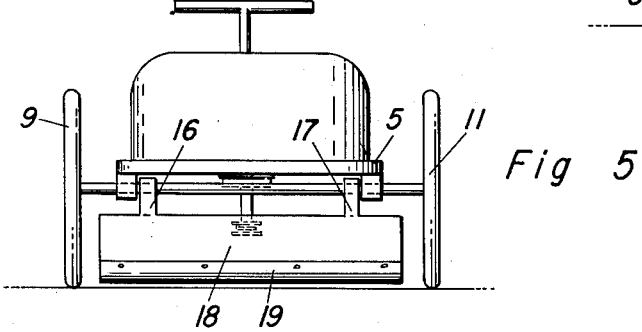
Fig. 5 is an enlarged rear elevation of Fig. 1 taken from the left of the drawing.

Then by rocking the steering post upon its pin 23, a pull will be transmitted through the turnbuckle links and turnbuckle to the board 18, thus rocking it about the axle as shown in dotted lines in Fig. 4, bringing the shoe 19 into contact with the surface supporting the vehicle and thus causing a braking action.

By pulling rearwardly a sufficient distance on the handle, adequate force may be applied to raise the rear wheels entirely off the ground, as shown in dotted lines in Fig. 4.

It will thus be seen that by rotating the handle and tipping the handle, that the vehicle may be steered and braked or released, as desired.

It is to be understood that the form of my invention herewith shown and described is to be taken as a preferred example of the same and that various changes relative to the material, size, shape and arrangement of parts may be resorted to without departing from the spirit of the invention or the scope of the subjoined claim, and it will be seen that my invention accomplishes all of the objects above set forth.

Having thus described my invention, I claim:

A combined brake and steering means for a vehicle having a rotatable front axle and ground-engaging wheels positioned thereon, a sprocket mounted on said axle in axial alignment with the pivotal point of said axle, a rear axle having ground-engaging wheels positioned thereon, a pivoted braking member secured to said rear axle, a steering post extending through said body, a channel-like member secured to said body, a pin extending through said post and having its ends in said channel-like member, whereby said steering post may rock on said pin and turn about a substantially vertical axis, a sprocket secured to said post, said sprocket having a chain reeved thereover and extending to said sprocket on said front axle, and an adjustable linkage connecting the lower end of said post and said braking member.

References Cited in the file of this patent

UNITED STATES PATENTS

| | | |
|---|---|---|
| 980,092 | Gagnon | Dec. 27, 1910 |
| 1,637,614 | Kohler | Aug. 2, 1927 |
| 1,755,299 | Linden | Apr. 22, 1930 |
| 2,201,440 | Le Tourneau | May 21, 1940 |
| 2,353,501 | Redling | July 11, 1944 |